US009066041B2

(12) United States Patent
Hilbrink et al.

(10) Patent No.: US 9,066,041 B2
(45) Date of Patent: Jun. 23, 2015

(54) SYSTEM AND METHOD FOR RETRIEVING INFORMATION WHILE COMMANDING OPERATION OF AN APPLIANCE

(71) Applicant: Universal Electronics Inc., Santa Ana, CA (US)

(72) Inventors: Marcel Hilbrink, Hengelo (NL); Patrick H. Hayes, Mission Viejo, CA (US); Jeremy K. Black, Santa Ana, CA (US)

(73) Assignee: UNIVERSAL ELECTRONICS INC., Santa Ana, CA (US)

( * ) Notice: Subject to any disclaimer, the term of this patent is extended or adjusted under 35 U.S.C. 154(b) by 0 days.

(21) Appl. No.: 13/801,703

(22) Filed: Mar. 13, 2013

(65) Prior Publication Data

US 2014/0098299 A1    Apr. 10, 2014

Related U.S. Application Data

(63) Continuation of application No. 11/179,289, filed on Jul. 11, 2005.

(60) Provisional application No. 60/588,523, filed on Jul. 16, 2004.

(51) Int. Cl.
*H04N 5/44* (2011.01)
*G08C 17/00* (2006.01)
*H04N 21/41* (2011.01)
*H04N 21/422* (2011.01)
*H04N 21/4363* (2011.01)

(52) U.S. Cl.
CPC .............. *H04N 5/4403* (2013.01); *G08C 17/00* (2013.01); *H04N 21/4126* (2013.01); *H04N 21/4222* (2013.01); *H04N 21/42222* (2013.01); *H04N 21/42225* (2013.01); *H04N 21/43637* (2013.01)

(58) Field of Classification Search
CPC . H04N 5/4403; H04N 5/44582; H04N 21/47; H04N 5/44; H04B 1/202; H04B 1/205; G08C 19/28; G08C 23/04; G08C 17/02; G07C 9/00182; G07C 2009/00793; H04L 12/282; G11B 31/00
USPC .............................. 340/12.22, 12.31; 348/734
See application file for complete search history.

(56) References Cited

U.S. PATENT DOCUMENTS

| | | |
|---|---|---|
| 4,623,887 A | 11/1986 | Welles, II |
| 4,959,810 A | 9/1990 | Darbee et al. |
| 5,481,256 A | 1/1996 | Darbee et al. |
| 5,614,906 A | 3/1997 | Hayes et al. |
| 5,877,699 A | 3/1999 | Sharpe et al. |
| 5,959,751 A | 9/1999 | Darbee et al. |
| 6,014,092 A | 1/2000 | Darbee et al. |
| 6,052,556 A | 4/2000 | Sampsell |
| 6,055,478 A | 4/2000 | Heron |
| 6,167,278 A | 12/2000 | Nilssen |
| 6,225,938 B1 | 5/2001 | Hayes et al. |

(Continued)

*Primary Examiner* — Omer S Khan
(74) *Attorney, Agent, or Firm* — Greenberg Traurig, LLP

(57) ABSTRACT

Media rendering system including a remote control device and associated docking station. The remote control device interfaces with a remote server to stream media content for local and/or external playback. The remote control device may interface with a docking station to playback rendered media on one or more entertainment appliances. The portable device preferably has standard remote control capability in order to enable advanced features and functions for media playback.

11 Claims, 9 Drawing Sheets

(56) References Cited

U.S. PATENT DOCUMENTS

| | | | |
|---|---|---|---|
| 6,460,109 B1* | 10/2002 | Kaply et al. | ............. 710/316 |
| 6,496,122 B2 | 12/2002 | Sampsell | |
| 6,549,942 B1 | 4/2003 | Janky et al. | |
| 2001/0035455 A1 | 11/2001 | Davis et al. | |
| 2002/0054084 A1 | 5/2002 | Udell | |
| 2003/0048295 A1 | 3/2003 | Lilleness et al. | |
| 2003/0103088 A1 | 6/2003 | Dresti et al. | |
| 2003/0193519 A1* | 10/2003 | Hayes et al. | ............. 345/721 |
| 2004/0004460 A1 | 1/2004 | Fitch et al. | |
| 2004/0019724 A1 | 1/2004 | Singleton, Jr. et al. | |
| 2004/0098571 A1* | 5/2004 | Falcon | ............. 713/1 |
| 2004/0208182 A1 | 10/2004 | Boles et al. | |
| 2004/0224638 A1 | 11/2004 | Fadell et al. | |
| 2005/0033124 A1 | 2/2005 | Kelly et al. | |
| 2005/0248502 A1* | 11/2005 | Okuley et al. | ............. 345/1.3 |

* cited by examiner

SYSTEM AND METHOD FOR RETRIEVING INFORMATION WHILE COMMANDING OPERATION OF AN APPLIANCE

RELATED APPLICATION DATA

This application claims the benefit of and is a continuation of U.S. application No. 11/179,289, filed Jul. 11, 2005, which application claims the benefit of U.S. Provisional Application No. 60/588,523, filed on Jul. 16, 2004, which applications are incorporated herein by reference in their entirety.

BACKGROUND OF THE INVENTION

This invention relates generally to consumer electronics, and, more particularly, relates to media rendering devices.

Many consumers have begun storing digital media files such as photos, audio files, video files, and multimedia files on personal computers, laptops, servers, or other computing devices for playback and sharing purposes. These consumers also typically have one or more controllable playback appliances (e.g., TV, Audio Receiver, etc.) in an entertainment environment that are capable of playing traditional media sources (i.e., media information from a VCR, DVD, CD, PVR, etc.). It has become increasingly popular among consumer electronics manufacturers to create devices and systems that enable the playback of digital media files from a consumers computing device on one or more of the consumers controllable playback appliances in the entertainment environment, typically by means of streaming or sending such media content over a wired or wireless network to the appliances via a "media rendering" device which is able to convert received digital information into analog signals or other input signals required by the playback appliances. Media rendering devices can be standalone devices, or can be integrated into any traditional entertainment appliance (i.e., TV, Audio Receiver, VCR, DVD, CD, PVR, etc).

Additionally, wireless control devices such as universal remote controls are widely used by consumers in conjunction with entertainment appliances for command and control purposes. It is also well known to provide a separate docking device ("docking station") with control devices for charging of batteries. While current universal remote control devices typically lack advanced computing and media rendering capabilities, more advanced control devices have begun to emerge and to incorporate such features. For instance, the HP iPaq rx3xxx series of Pocket PC's is able to function as a wireless control device using onboard software and wireless communication (IR and/or RF) capabilities, and also incorporates media rendering capabilities in that it can stream and playback media content from a server.

It is desirable for users of such advanced control devices to not only control the functions of entertainment appliances and make use of onboard media rendering capabilities, but also to interface with the entertainment appliances such that media streamed to the control device, or contained locally on the control device may be played on the entertainment appliances. Accordingly, it is desired to provide a system for rendering media on one or more entertainment appliances using a control device and associated docking station which functions to both charge the control device, and provide an interface between the control device and entertainment appliance(s) for playback of media information.

SUMMARY OF THE INVENTION

In accordance with these needs and desires, a system including a control device and associated docking station is hereinafter described. Generally, an advanced control device, such as a universal remote control with integrated media rendering capabilities is described, which, in conjunction with an associated docking station, is able to play back rendered media files on a users entertainment appliance(s). As a user operates the onboard media rendering capabilities of the advanced control device, the current media content being rendered may be played back on the users entertainment appliances(s) by placing the control device in the associated docking station. Based on detection by the control device of docked or undocked states, various additional control and media playback functions may be effected.

A better understanding of the objects, advantages, features, properties and relationships of the subject system and devices will be obtained from the following detailed description and accompanying drawings which set forth illustrative embodiments which are indicative of the various ways in which the principles of the system and devices may be employed.

BRIEF DESCRIPTION OF THE DRAWINGS

For a better understanding of the invention, reference may be had to a preferred embodiment shown in the following drawings in which.

DETAILED DESCRIPTION

With reference to the figures, a system and devices are described for use in rendering media files for playback on one or more entertainment appliances.

Generally, an advanced control device, such as a universal remote control with integrated media rendering capabilities is described, which, in conjunction with an associated docking station, is able to play back rendered media files on a users entertainment appliance(s). As a user operates the onboard media rendering capabilities of the advanced control device, the current media content being rendered may be played back on the users entertainment appliances(s) by placing the control device in the associated docking station.

Advanced control devices as contemplated by the current invention may take a variety of forms, but in general are able to accomplish both remote control based functions (i.e., Power, Volume Up/Down, Channel Up/Down, Transport functions, etc.) via IR and/or RF communication links, and media rendering functions (i.e., Audio/video streaming and playback from a remote server). One example of such advanced control devices is the iPaq rx3xxx series of Pocket PC's by Hewlett Packard Corp. which incorporates Nevo home control software and iPaq Media Manager software (both by Universal Electronics Inc.) for remote control and media rendering functions. For further information regarding the Nevo home control software, the interested reader is referred to published pending U.S. patent applications 2003/0103088 "User Interface for a Hand Held Remote Control Device;" 2003/0193519 "System And Method For Controlling The Recording Functionality Of An Appliance Using A Program Guide;" and 2003/0048295 "System and Method for Updating Information in a Portable Electronic Device", all incorporated herein by reference in their entirety.

Generally, the docking station includes a power input for charging the control device when docked, interface connections for connecting to one or more entertainment appliances, and contact points for electrically connecting the control device to the docking station when the control device is docked.

Either or both the control device and docking station may contain software and/or hardware components for enabling the detection of docked and undocked states to enable the functions and features set forth herein.

Figure 1:
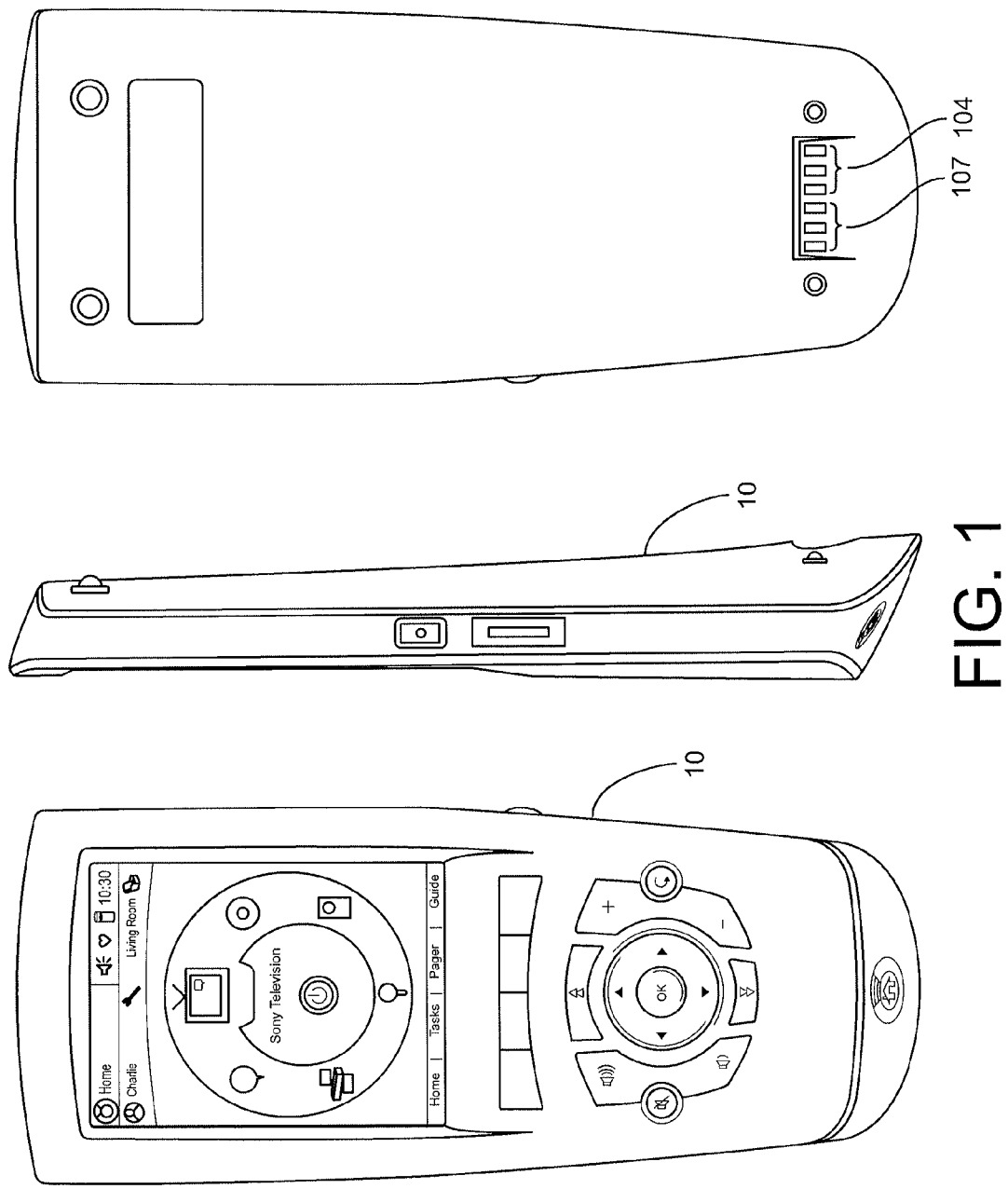
FIG. 1 illustrates a pictorial drawing of an exemplary universal remote control in which the principles of the subject invention may be embodied.

Looking now to the figures, an exemplary remote control device 10 is shown in FIG. 1. Integrated recharging contacts 107 and signal contacts 104 enable electrical connection and communication with docking station 700. As will be described below in greater detail, contacts 107 and 104 interface with recharging contacts 707 and signal contacts 704 of the docking station 700, respectively.

Figure 2:
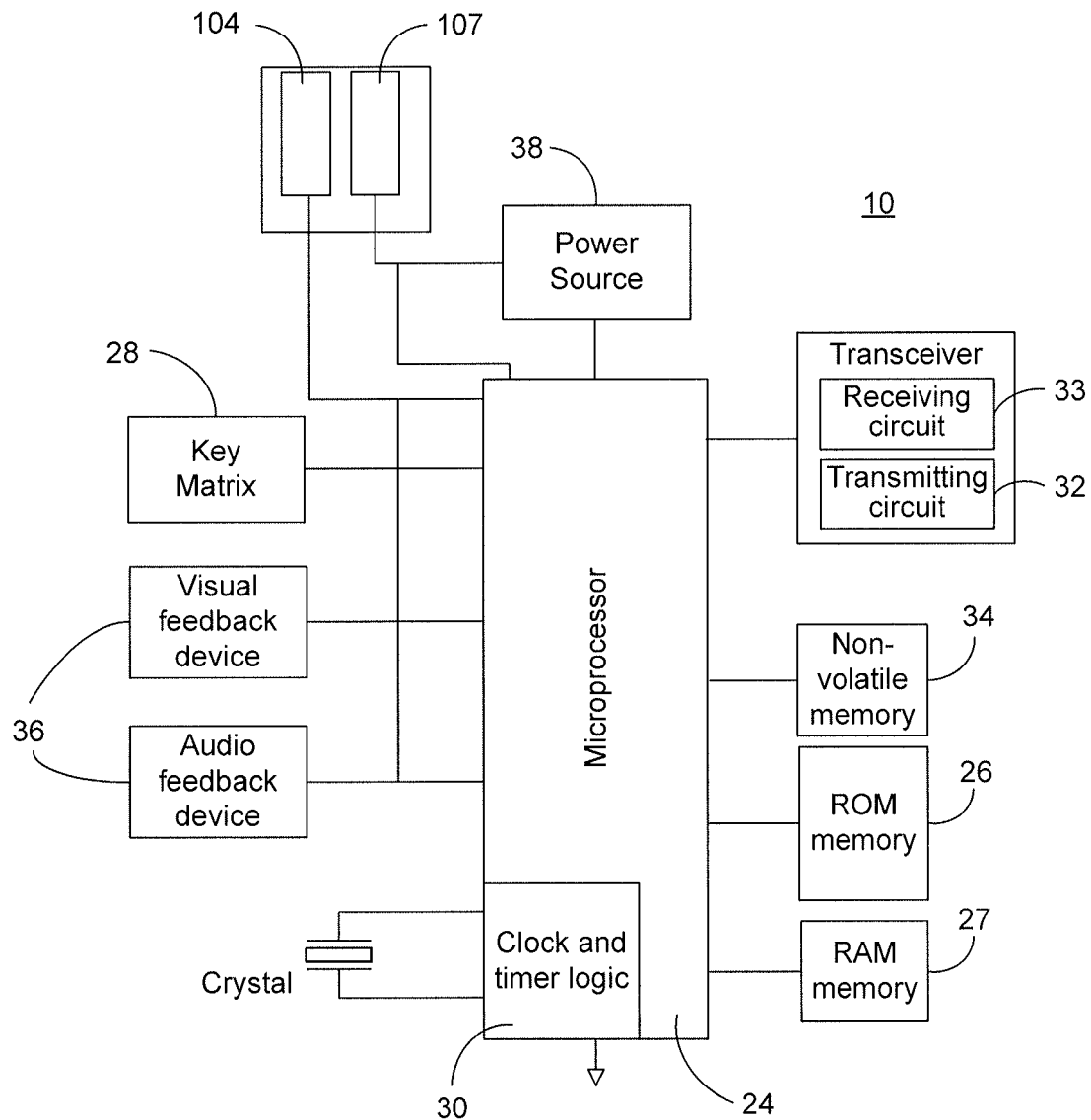
FIG. 2 illustrates a block diagram of components of an exemplary remote control.

For use in transmitting command codes and other data to one or more of the appliances 12, the remote control 10 may include, as needed for a particular application, a processor 24 coupled to a memory device (such as ROM memory 26, RAM memory 27, and/or a non-volatile memory 34), a key matrix 28 (e.g., physical buttons, a touch screen display, or a combination thereof), an internal clock and timer 30, transmission circuit(s) 32, receiver circuit(s) 33 and/or transceiver circuit(s) (e.g., IR and/or RF), a means 36 to provide feedback to the user (e.g., LED, display, speaker, and/or the like), and a power supply 38 as generally illustrated in FIG. 2. As will be understood by those of skill in the art, the memory device may include executable instructions that are intended to be executed by the processor 24 to control the operation of the remote control 10. In this manner, the processor 24 may be programmed to control the various electronic components within the remote control 10, e.g., to monitor the power supply 38 and the recharging status thereof, to cause the transmission of signals, etc.

The non-volatile read/write memory 34, for example an EEPROM, battery-backed up RAM, Smart Card, memory stick, or the like, may be provided to store setup data and parameters as necessary. While the memory system is described as comprising all three classes of memory, it will be appreciated that, in general, such a memory system need not necessarily support all three, and can be comprised of any type of computer-readable media, such as ROM, RAM, SRAM, FLASH, EEPROM, Smart Card, memory stick, a chip, a hard disk, a magnetic disk, and/or an optical disk or the like in combination. Preferably, however, at least part of the memory system should be non-volatile or battery backed such that basic setup parameters and operating features will survive loss of battery power. Still further, it will be appreciated that some or all of the illustrated memory devices 26, 27, and 34 may be physically incorporated within the same IC chip as the microprocessor 24 (a so called "microcontroller") and, as such, they are shown separately in FIG. 2 only for the sake of clarity. For accomplishing media rendering operations of the current invention, the memory devices of the remote control may be configured with programming and instructions to receiving incoming media streams from receiving circuit 33, to convert those streams to media data which is able to be played by one or more playback applications of remote control 10 via the display, speaker(s), or other feedback mechanism.

To identify home appliances by type and make (and sometimes model) such that the remote control device 10 is adapted to transmit recognizable command codes in the format appropriate for such identified appliances 12, data may be entered into the universal remote control device 10. Since methods for setting up a remote control to control the operation of specific home appliances are well-known, such methods need not be described in greater detail herein. Nevertheless, for additional information pertaining to remote control setup, the reader may turn to U.S. Pat. Nos. 4,959,810, 5,614,906, and 6,225,938 or previously referenced published application U.S. 2003/0103088. It will also be appreciated that the remote control 10 may be set up to control an appliance 12 by being taught the command codes needed to control such appliance as described in U.S. Pat. No. 4,623,887.

To cause the remote control 10 to perform an action, the remote control 10 is adapted to be responsive to events, such as a sensed user interaction with the key matrix 28, receipt of a transmission, etc. In response to an event, appropriate instructions within the memory 26 may be executed. For example, when a command key is activated on the remote control 10, the remote control 10 may retrieve a command code corresponding to the activated command key from memory 26 and transmit the command code to a device in a format recognizable by the device. It will be appreciated that the instructions within the memory 26 can be used not only to cause the transmission of command codes and/or data to the appliances 12 but also to perform local operations, i.e., responding to a dock or undock event such that media playback on remote control 10 is appropriately initiated, rerouted, or converted, as described in greater detail below. While not limiting, other local operations that may be performed by the remote control 10 include displaying information/data, favorite channel setup, macro button setup, function key relocation, remote location sensing, etc. Examples of local operations can be found in U.S. Pat. Nos. 5,481,256, 5,959,751, and 6,014,092. Additional examples of remote controls 10 may be found in commonly owned, U.S. Pat. No. 6,225,938 and U.S. Application Ser. Nos. 60/264,767, 09/905,423, 09/905,432, and 09/905,396.

Figure 5:
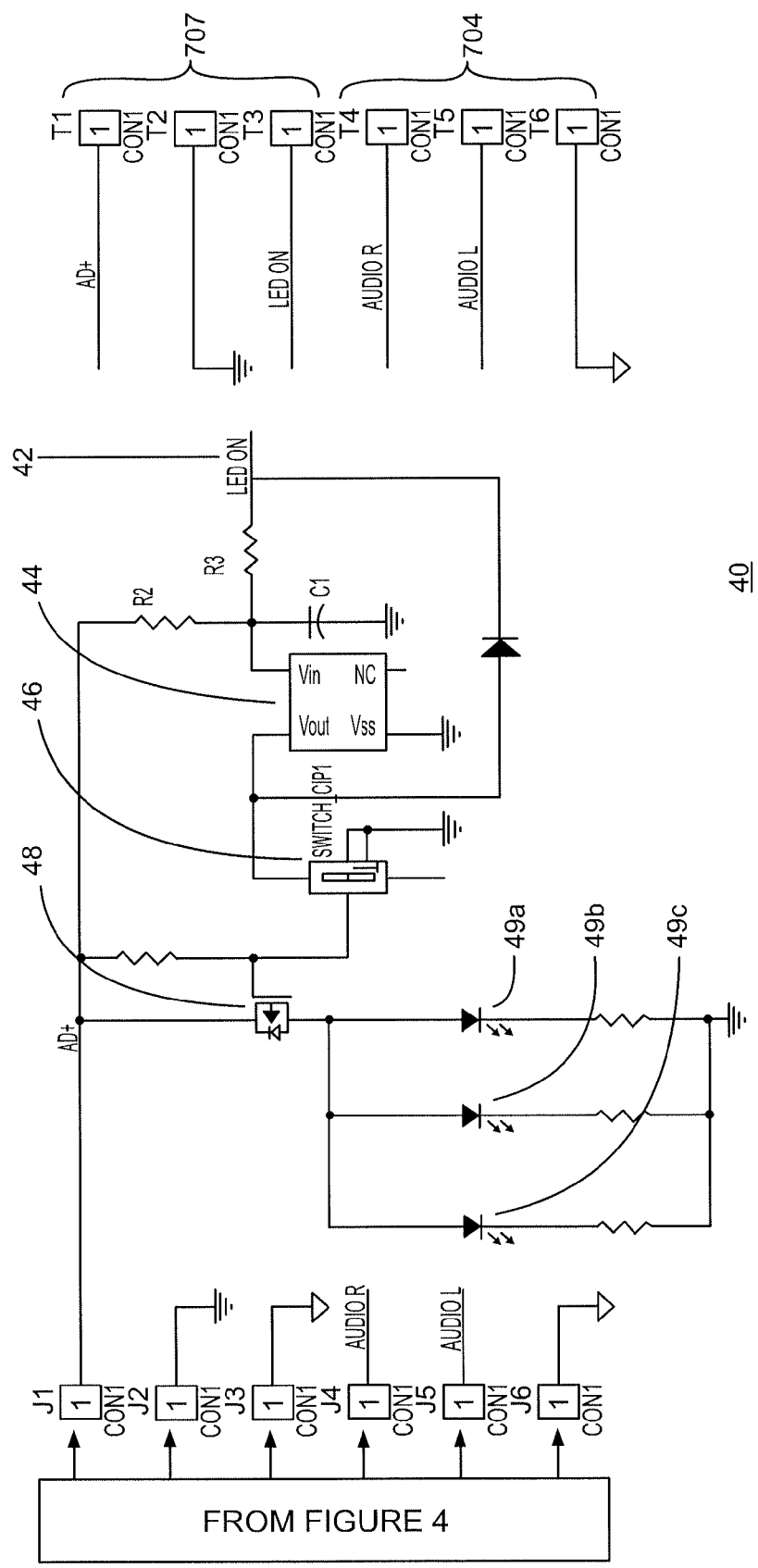
FIG. 5 illustrates an electrical schematic diagram of an exemplary delay circuit of the exemplary docking station.

Also included in the docking station 700 is exemplary delay circuit 40 shown in FIG. 5 providing circuitry for powering on one or more LED's 49a, 49b, 49c to indicate to a user that the remote control 10 has detected that it is properly docked in docking station 700. In general, such docking circuitry and associated monitoring programming for enabling so called "hot" docking operations (i.e., electrically connecting a portable device to a power source such as a dock while the portable device is powered on) is well known in the art and the functions and features of thereof will be understood and appreciated by those skilled in the art. In particular, with reference to delay circuit 40, when remote control 10 detects that it has been successfully docked, its power monitoring programming may enable the "LED ON" signal 42 via recharging contacts 107, 707, causing timer IC 44 to enable transistor 48, thereby illuminating charging base LEDs 49a, 49b, 49c for a predetermined period of time. Switch 46 is provided to allow the user to disable this feature if desired.

Figure 3:
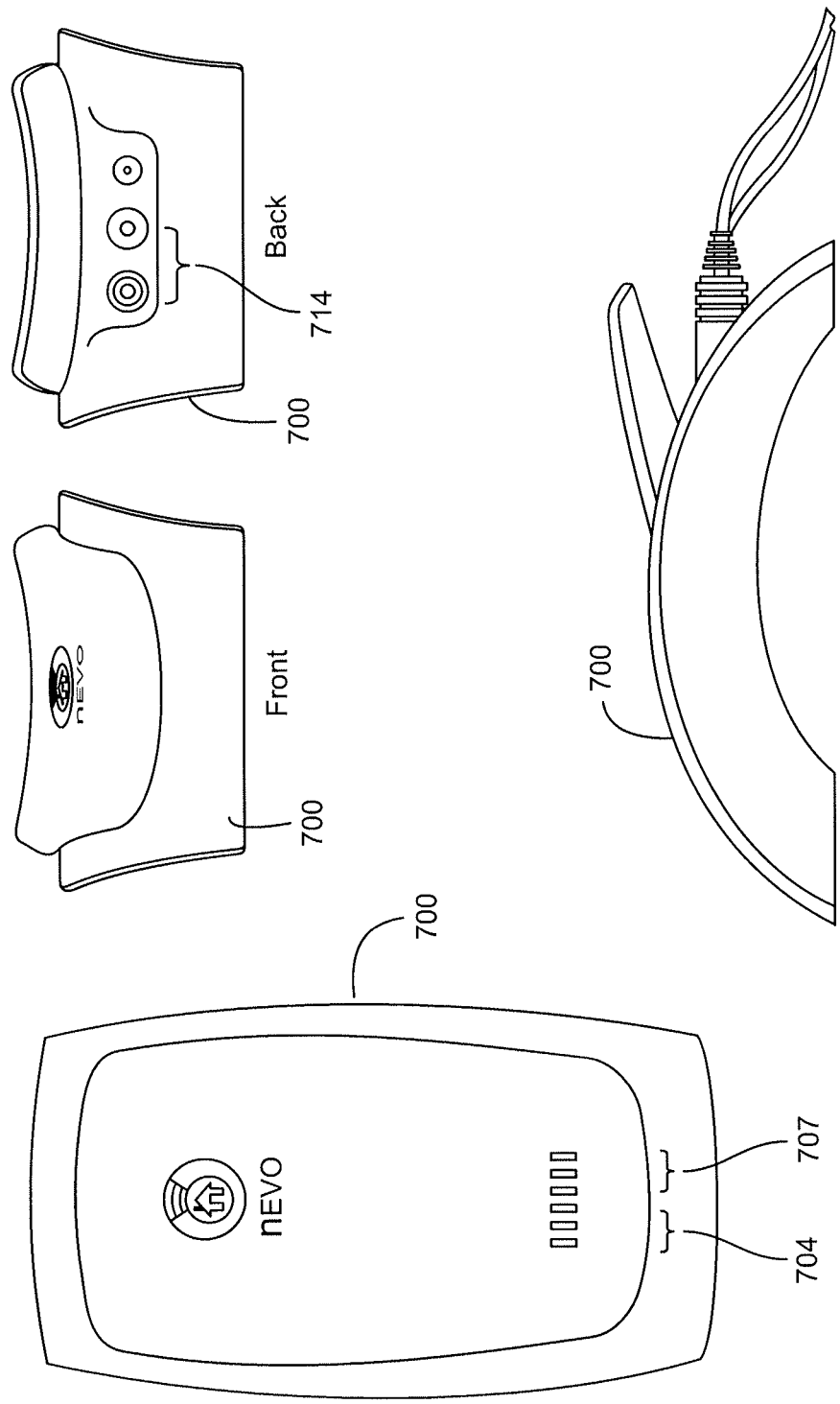
FIG. 3 illustrates a pictorial drawing of an exemplary docking station for use in connection with the universal remote control illustrated in FIG. 1.
Figure 4:
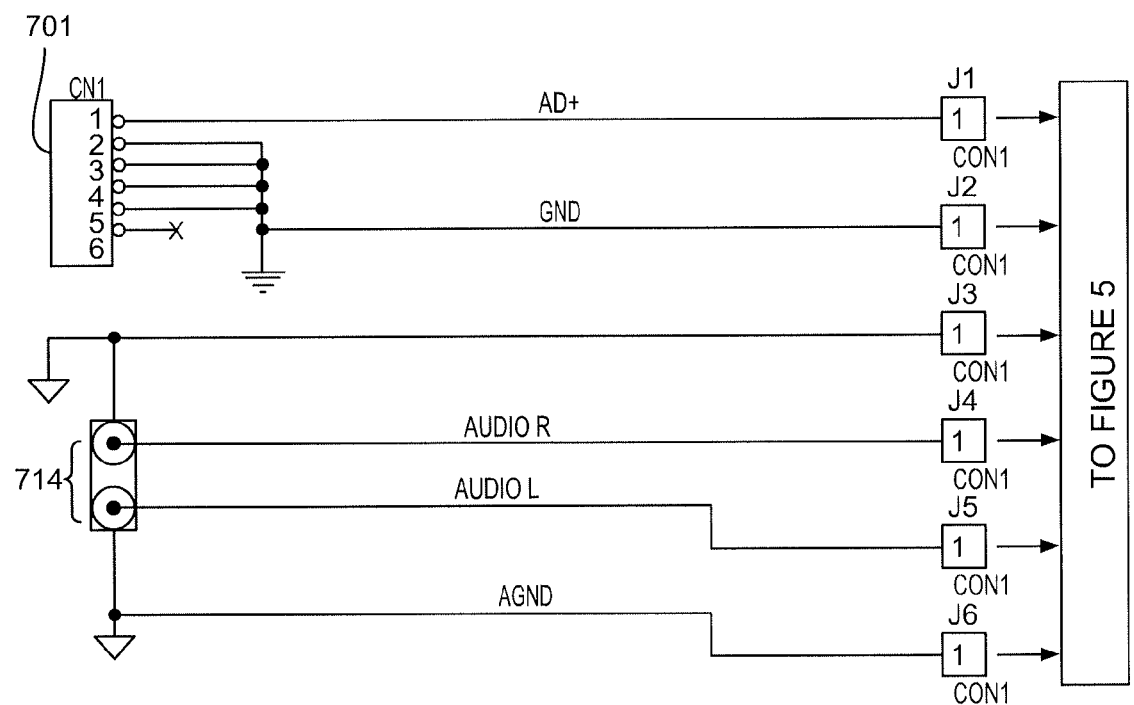
FIG. 4 illustrates an electrical schematic diagram of the connection points of the exemplary docking station illustrated in FIG. 3.

FIG. 3 shows exemplary docking station 700 which is able to provide power and/or a communication interface to remote control 10. To this end and as described above, the remote control may include recharging contacts 107 and signal contacts 104. The contacts 107 and 104 are provided to electrically couple with corresponding contacts 707 and 704 in the charging base 700. The exemplary docking station 700 depicted in FIG. 3 may therefore comprise a power input 701 for attachment to, for example, stepped-down power originating from an adapter (not shown) plugged into a household electrical socket. Input 701 is connected to contacts 707. In one embodiment as shown in FIG. 4, the signal contacts 704 which interface with signal contacts 104 on remote control 10 connect to output interface 714 and ground 716. Output interface 714 depicted in FIGS. 3 and 4 is a standard left/right RCA audio output connection which can easily be connected with an audio receiver or other audio playback appliance. It will be understood that output interface 714 could be any connection type, including but not limited to RCA, Optical TOS, S-Video, Component Video, DVI, Coaxial, HDMI, etc. Additionally, circuitry and other signal conversion means may be implemented with docking station 700 to enable the output of a wide variety of signals, digital or analog, from docking station 700 without departing from the spirit and scope of the current invention.

Figure 6:
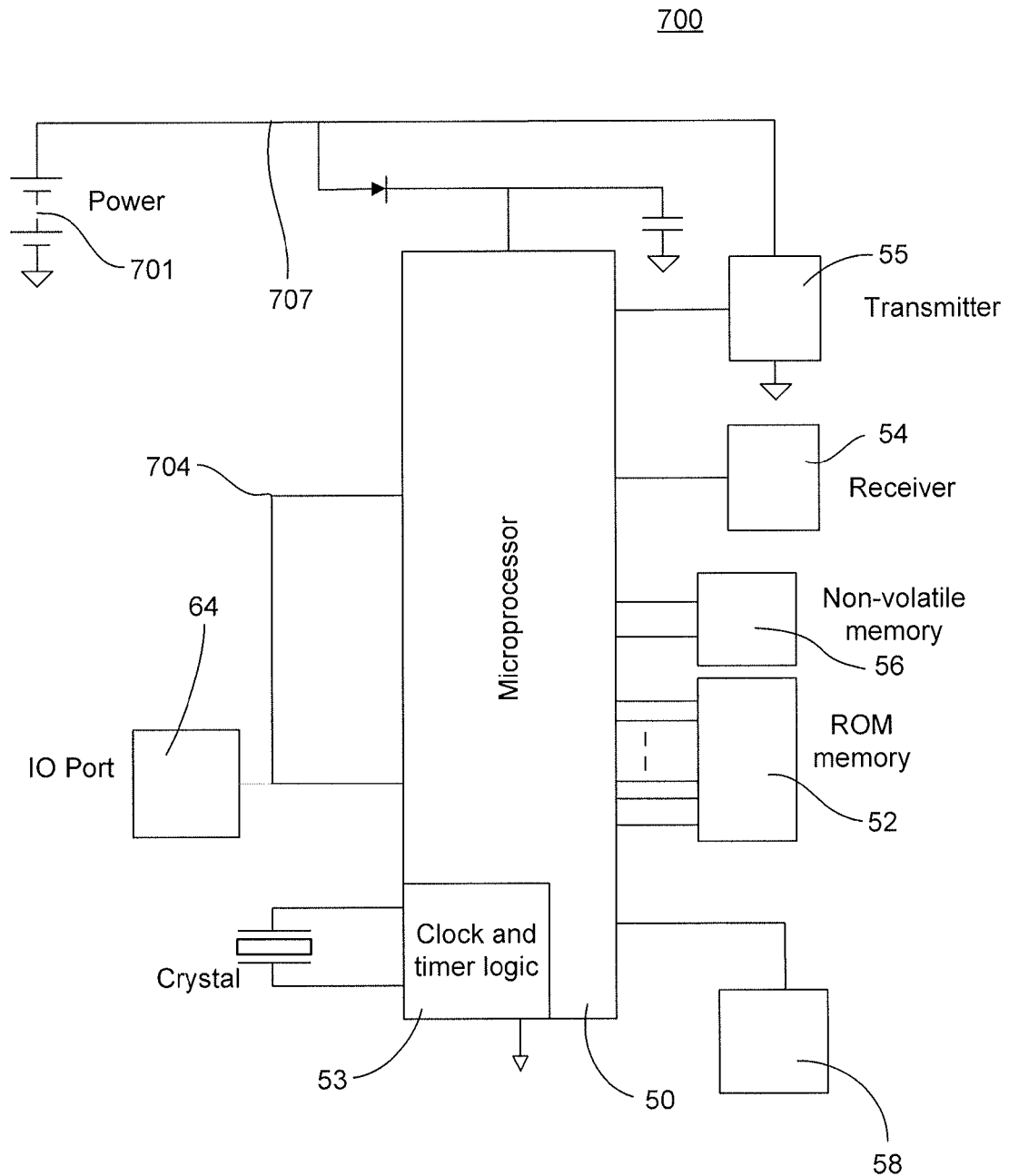
FIG. 6 illustrates a block diagram of the components of the exemplary docking station which has integrated transceiver capabilities.
Figure 7:
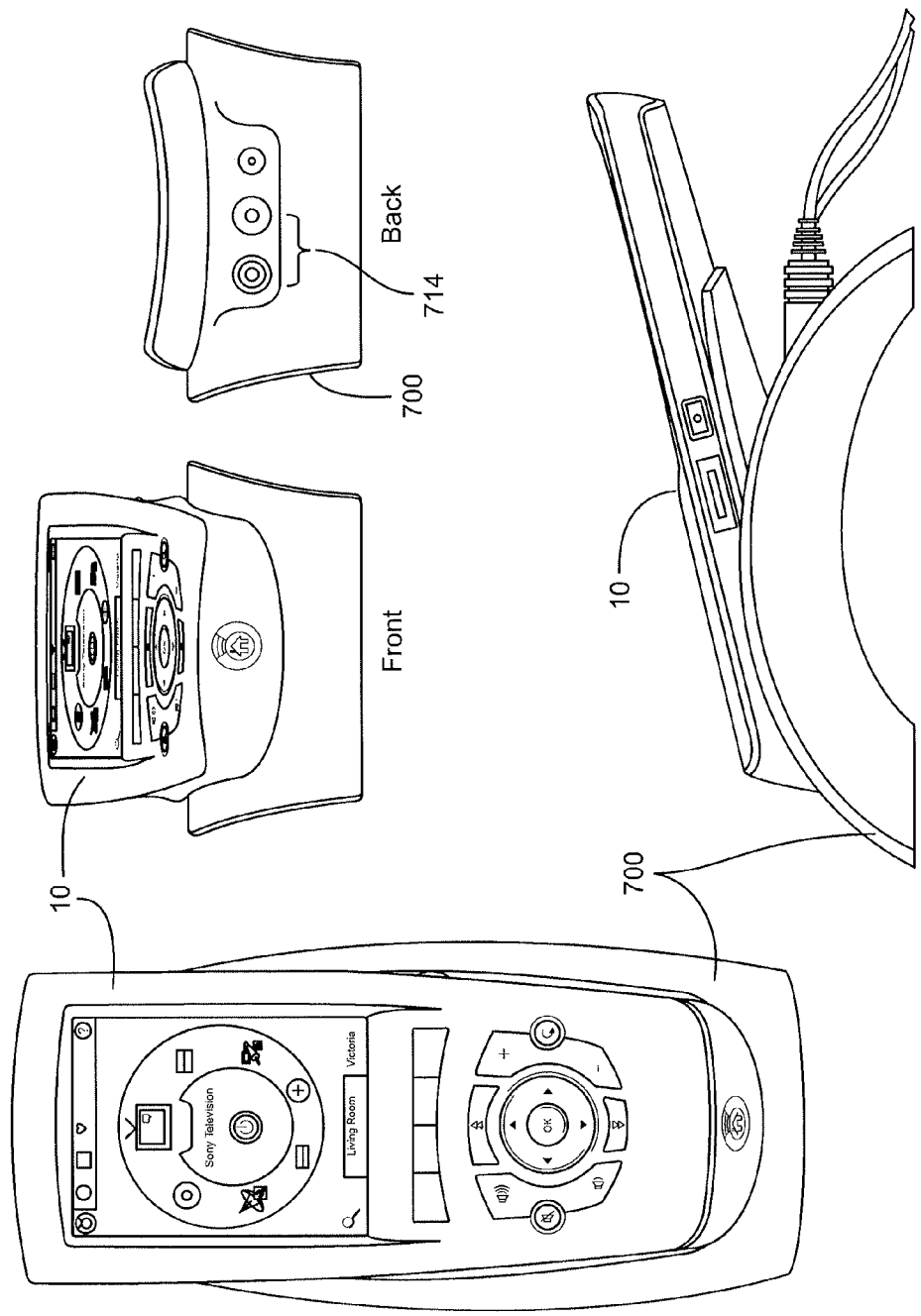
FIG. 7 illustrates a pictorial drawing of the universal remote control and docking station in a docked state.

Optionally, as illustrated in FIG. 6, docking station 700 may be configured with additional components to enable enhanced capabilities in conjunction with remote control 10, such as wireless media transmission and reception, addressability for location based functions, and advanced command and control functions. As such, docking station 700 may include, as needed for a particular application, a processor 50 coupled to a ROM memory 52, an internal clock and timer 53, receiver circuit(s) 54, transmission circuit(s) 55 and/or transceiver circuit(s) (e.g., IR and/or RF), a non-volatile read/write memory 56, a means 58 to provide feedback to the user (e.g., LED, display, speaker, and/or the like), a power supply 701, and input means 64, (e.g., serial I/O port, Ethernet, 1394 firewire, wireless receiver, bar code scanner, etc.), recharging contacts 707 and signal contacts 704, as is generally illustrated in FIG. 6. The input means 64 may be used to connect the docking station 700 to a common home control unit (such as a server, HVAC controller, etc.) in order to enable communication and timing operations between several other docking stations, media servers, and/or appliances. The ROM memory 52 includes executable instructions that are intended to be executed by the processor 50 to control the operation of the docking station 700. In this manner, the processor 50 may be programmed to control the various electronic components within the docking station 700, e.g., to monitor the power supply 701 and contacts 707 and 704, to cause the transmission of signals, to provide audio or visual prompts to a user, etc. The non-volatile read/write memory 56, for example an EEPROM, battery-backed up RAM, Smart Card, memory stick, or the like, is provided to store setup data and parameters as necessary. While the memory 52 is illustrated and described as a ROM memory, memory 52 can also be comprised of any type of readable media, such as ROM, RAM, SRAM, FLASH, EEPROM, or the like. Preferably, at least part of the memory 56 is non-volatile or battery-backed such that data is not required to be reloaded after power is removed from central state server 14. In addition, the memories 52 and 56 may take the form of a chip, a hard disk, a magnetic disk, and/or an optical disk. It will also be appreciated that in cases where docking station capability is integrated into an appliance, some or all of the functional elements described above in conjunction with FIG. 6 may be combined with similar elements already present in the appliance for other purposes.

Figure 9:
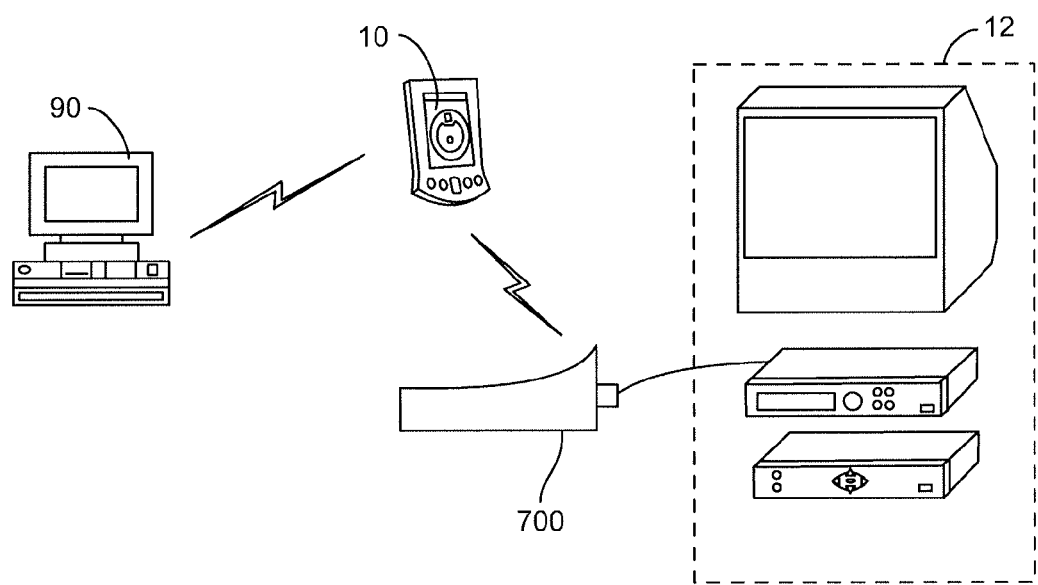
FIG. 9 illustrates an alternate embodiment of the media rendering system of the present invention.

For transmitting and receiving information between remote control 10 and docking station 700 when remote control 10 is not in a docked state (as shown in FIG. 9), communication may be performed using an IR protocol such as XMP (described in co-pending U.S. patent application Ser. No. 10/431,930) an RF protocol such as Bluetooth or 802.11, X-10 commands, SCP, IP, UPnP, HAVi, or any other suitable wireless and/or wired transmission methods. All that is required is that the remote control 10 and docking station 700 be able to communicate data in at least a unidirectional fashion from the remote control 10 to the docking station 700 in order to enable the system of the current invention. It will be appreciated that due to the wide variety of communication methods and protocols that may be required to adequately communicate information to and/or from the docking station, the ability of the remote control and/or docking station to dynamically transmit and receive a greater number of protocols will enable compatibility for media rendering and streaming operations with a greater number of media types and formats. It will additionally be appreciated that programming on the remote control and/or docking station may be used for making determinations as to which communication methods and protocols may be used for a given media format to most effectively bring about desired media rendering operations, as described in greater detail below.

Figure 8:
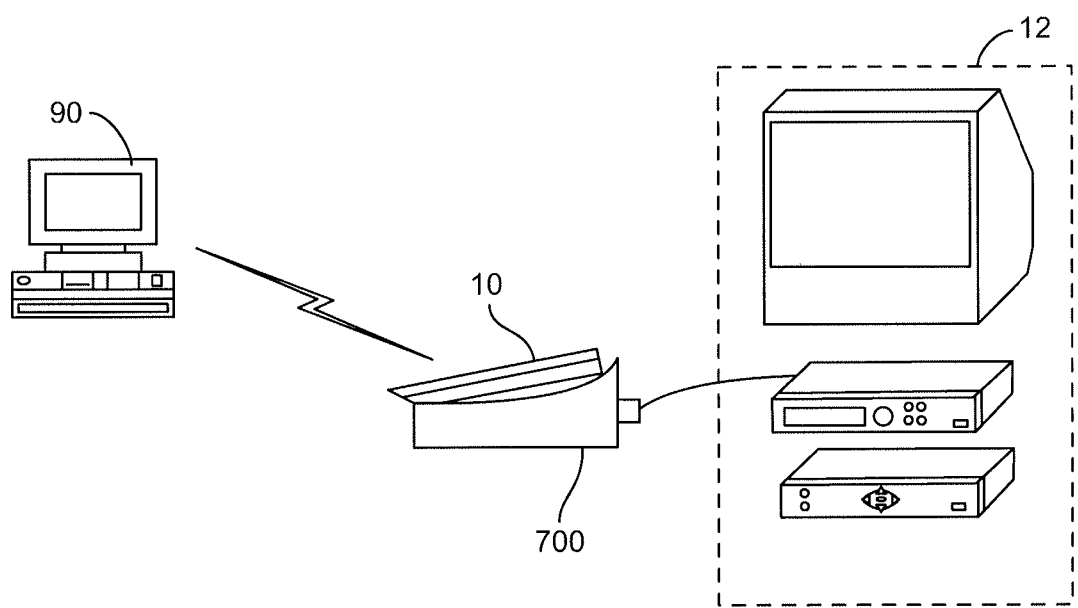
FIG. 8 illustrates one embodiment of the media rendering system of the present invention.

FIGS. 8 and 9 illustrates two configurations for interfacing the remote control 10 with a docking station 700 for purposes of rendering media (generally stored or accessible from server 90) on associated entertainment appliance(s) 12. Configuration 1 shown in FIG. 8 is representative of the above-described system configuration where the remote control 10 interfaces with the docking station 700 only via a physical connection (signal contacts 104 and 704). Configuration 2 shown in FIG. 9 is representative of a wireless interface where the data is able to be sent through the transmitting circuit 32 of the remote control 10, to the receiver 54 of docking station 700. It will be understood that server 90 may be any remote computing device, from which media files may be made accessible to remote control 10 for streaming and/or media rendering purposes as contemplated by the present invention.

In keeping with the subject system and method, the remote control 10 and/or docking station 700 preferably include programming such that docking states may be readily ascertained in order to appropriated manipulate media streams being rendered or played back via the remote control 10. For example, when docking station 700 is configured without wireless communication means as shown in FIG. 4 and is essentially a signal pass through for remote control 10, programming on remote control 10 may be configured to play rendered media from onboard display or speaker elements (local playback mode) when in an undocked state, and upon initiation of a dock event, to reroute the currently playing media information from the onboard display or speaker elements to the signal contacts 104 for playback on the users entertainment appliance(s) (external playback mode) connected to connection interface 714 of the docking station. In this way a user may easily switch between the local playback mode and external playback mode by simply docking and undocking the remote control as desired. Additionally, programming on the remote control 10 may implement command and control events for the entertainment appliance(s) on which media information is to be played in response to detection of dock and undock states. For example, in order that an audio file being played back locally on the remote control 10 begins playing externally on the users desired audio receiver connected to the docking station when a dock event occurs without further intervention by the user, the remote control may be programmed to power on the audio receiver and select the correct input mode upon detection of a dock event. Likewise, in addition to switching back to a local playback mode, the remote control may be programmed to power down or otherwise modify the functional states of an entertainment appliance upon detection of an undock event. In this context, a contemplated embodiment of the docking station may include additional contacts used to convey an address value to the remote control placed into it. In this manner multiple docking stations may be provided for different rooms, each with a unique address, and the remote control may be adapted to automatically configure its command formats and sequences to match the equipment in the room in which it is currently docked. In any case, it will be understood that any number of functions and/or actions may be implemented on the remote control in response to detection of dock and undock events.

For systems in which the docking station includes wireless and/or other functional capabilities as generally described in connection with FIG. 6 above, additional features and functions may be accomplished. For example, as shown generally in FIG. 9, a wireless capable docking station may be configured to receive media information from remote control 10 wirelessly before output to entertainment appliances 12. In this way media being rendered on remote control 10 could be sent to docking station 700 when docked or undocked. Programming on remote control 10 may present a user with on screen selection buttons to select whether a user desires local or external playback modes. Additionally, it may be desirable to implement multiple docking stations in cases where a user has more than one entertainment environment on which rendered media is desired to be played back. Each docking station may be assigned, either at the time of manufacture or by a user, an address sufficient to uniquely identify the dock from among other docks used in conjunction with the remote control. The address information may be read or received by the remote control upon a docking event with a given docking station, or may be sent wirelessly by the docking station in response to a request by the remote control or as part of an automated process in the docking station. Programming on the remote control may use the address information from the docking station to accomplish location based functions (such as those described more fully in co-pending application 60/517,558 entitled "System and Method for Controlling Device Location Determination") or other advanced command and control functions. Additionally, dock and undock events detected by the remote control may be used to initial save and recall state operation, such as those described more fully in co-pending application 60/517,737 entitled "System and Method for Saving and Recalling State Data for Media and Home Appliances." It is also contemplated that docking station 700 may including onboard IR receiver capabilities and associated programming to enable command and state monitoring functions, such as those described more fully in co-pending application Ser. Nos. 10/665,650 entitled "System and Method for Monitoring Remote Control Transmissions," and Ser. No. 10/603,839 entitled "System and Method for Monitoring Remote Control Transmissions."

The system and devices of the present invention has been described above in terms of functional modules in block diagram format. It is understood that unless otherwise stated to the contrary herein, one or more functions and features may be integrated in a single physical device or a software module in a software product, or one or more functions may be implemented in separate physical devices or software modules, without departing from the scope and spirit of the present invention.

For instance, it will be understood and appreciated by those skilled in the art that the remote control 10 of the present invention may be any portable control device (including but not limited to IR and/or RF based remotes, portable phones, wireless capable PDAs, etc.) capable of rendering media data and sending command codes remotely to appliances 12. Likewise, the docking station 700 of the present invention may be any device that is able to interface with remote control 10 in order to recharge and communicate data. Still further, it will be appreciated that the docking station 700 may be configured (using any of the configuration methods discussed above) to thereby adapt the docking station 700 to communicate commands to one of more appliances, e.g., the docking station 700 may have a library of commands, may be adapted to learn commands, etc. It will also be understood that in this case the remote control 10, for example, may communicate "generic" commands to the docking station 700, i.e., commands not having an appliance specific format or protocol, which "generic" commands may then translated by the docking station 700 to commands which are formatted appropriately for an intended target appliance for communication by the docking station 700 to the same.

All patents cited within this document are hereby incorporated by reference in their entirety.

It is appreciated that detailed discussion of the actual implementation of each module is not necessary for an enabling understanding of the invention. The actual implementation is well within the routine skill of a programmer and system engineer, given the disclosure herein of the system attributes, functionality, and inter-relationship of the various functional modules in the system. A person skilled in the art, applying ordinary skill can practice the present invention without undue experimentation.

While various concepts have been described in detail, it will be appreciated by those skilled in the art that various modifications and alternatives to those concepts could be developed in light of the overall teachings of the disclosure. As such, the particular concepts disclosed are meant to be illustrative only and not limiting as to the scope of the invention which is to be given the full breadth of the appended claims and any equivalents thereof

What is claimed is:

1. A method for causing an appliance to play streaming media, comprising:
    receiving at a portable electronic device a media stream;
    causing the portable electronic device to route the received media stream for a playing of the received media stream on the portable electronic device;
    detecting by that the portable electronic device that the portable electronic device has been placed into communication with the appliance; and
    in response to the portable electronic device detecting that the portable electronic device has been placed into communication with the appliance:
        causing the portable electronic device to automatically reroute the received media stream for a playing of the received media stream on the appliance instead of routing the received media stream for the playing of the received media steam on the portable electronic device;
        causing the appliance to be automatically placed into an operating state appropriate for the playing of the received media stream on the appliance comprises causing the appliance to be automatically placed into a powered on state.

2. The method as recited in claim 1, wherein the portable electronic device is placed into communication with the appliance via use a wireless communications protocol.

3. The method as recited in claim 2, wherein the wireless communications protocol comprises a radio frequency protocol.

4. The method as recited in claim 1, wherein the portable electronic device comprises commands transmittable to the appliance to control functional operations of the appliance.

5. The method as recited in claim 4, wherein the commands transmittable to the appliance include a power on and a power off command.

6. The method as recited in claim 1, wherein the appliance comprises a television.

7. The method as recited in claim 1, comprising causing the portable electronic device to receive the media stream from a server device via a wide area network.

8. The method as recited in claim 1, comprising causing the portable electronic device to receive the media stream from a server device via a local area network.

9. The method as recited in claim 1, wherein causing the appliance to be automatically placed into the powered on state comprises causing the portable electronic device to automatically transmit a power control command to the appliance.

10. The method as recited in claim 1, wherein causing the appliance to be automatically placed into the operating state appropriate for the playing of the received media stream on the appliance further comprises causing the appliance to be automatically placed into a selected input mode state.

11. The method as recited in claim 10, wherein causing the appliance to be automatically placed into a selected input mode state comprises causing the portable electronic device to automatically transmit an input mode selection command to the appliance.

* * * * *